United States Patent Office 2,694,666
Patented Nov. 16, 1954

2,694,666

METHOD OF PURIFYING AND ISOLATING PROTEINS

Ivan A. Parfentjev, New Haven, Conn.

No Drawing. Application May 11, 1951,
Serial No. 225,925

6 Claims. (Cl. 167—75)

This invention relates to the precipitation, fractionation and purification of proteins for the production of purified products.

The process of the present invention is a two-step process in which an aqueous protein solution is admixed with a soluble salt of a high molecular weight heterocyclic or aromatic amine, particularly a salt of an antihistaminic drug, and the amine is precipitated from such solution together with the protein as an insoluble adsorption complex; and the complex is then treated to separate the protein from the amine to give a purified protein product.

Processes are known for the fractionation, separation and purification of proteins, but the known processes have disadvantages. Some deproteinizing agents for the complete precipitation of proteins must be used at high concentrations. Thus, with ammonium sulfate it is necessary to add about 60% of the sulfate to precipitate serum protein. Sodium sulfate is less soluble than ammonium sulfate, and the amount of this salt which is dissolved at saturation is not enough to precipitate the serum proteins completely. Furthermore, in order to recover the proteins salted out with sodium or ammonium sulfate, it is necessary to free them from these salts by long and tedious dialysis; and treatment with these salts tends to cause denaturation of the proteins.

Other deproteinizing agents precipitate proteins at a high concentration and also at a very acid pH. Trichloracetic acid, for instance, added in amounts of 10–20% to a solution of protein, produces strong acidity. Under such treatment, proteins tend to become denatured, with loss of biological activity, as in the precipitation of antitoxins with chloracetic acid.

Alcohol, which is one of the oldest materials proposed for the precipitation of proteins, possesses strong denaturing effects on protein and also extracts some ingredients contained in proteinous material. It has been proposed to precipitate protein with alcohol at a low temperature, which reduces the denaturing action; but even in this case some changes in the proteins tend to take place. For instance, in the fractionation of serum protein by increasing amounts of alcohol, fractions are obtained which possess a strong anticomplementary effect that was not present in the original serum. Also, for the precipitation of protein, it is necessary to use very large amounts of alcohol, in some cases up to 90%.

For the precipitation of insulin, protamine and globin prepared from fish protein and mammalian hemoglobin are used. Both are proteins and, as is the case with other proteins, their chemical structures are not definitely established. Moreover, the isoelectric point of protamine is at pH 8. When insulin is injected as insoluble protamine-insulin into the human body, it has a pH of 7.4, which represents a rather unstable complex.

The present invention provides an improved process for the precipitation of protein and the recovery of the protein from the precipitate, which overcomes the objection and disadvantages above referred to and which enables protein products and fractions to be obtained in a simple manner.

The present invention provides an improved process for the precipitation, fractionation or purification of proteins and provides improved protein products which are not denatured.

The improved process of the present invention is of special value for the purification and fractionation of protein such as serum proteins and insulin.

I have found that proteins can be advantageously precipitated from their solutions as insoluble amine-protein adsorption complexes by admixing the protein solution with a water-soluble salt of a high molecular weight heterocyclic or aromatic amine and bringing the solution to approximate neutrality which will precipitate the amine and cause the freshly precipitated amine in the presence of the protein to adsorb protein and form an insoluble amine-protein adsorption complex. The term 'complex" is used to refer to the insoluble product formed by adsorption of protein from solution on the freshly precipitated amine.

The amines which are used in the form of their salts for treating the protein solutions are the antihistamines and their analogues and heterocyclic and aromatic amines of high molecular weight which are insoluble in water in the form of the free amines, but which become water-soluble at acid reaction by attaching them to an acid radical to form the water-soluble amine salt. When such acid solutions are brought to neutrality or approximate neutrality, the amines are precipitated and, in the presence of the proteins, the freshly precipitated amines and the proteins form insoluble adsorption complexes.

By limiting and regulating the amount of amine salt used, selective and fractional precipitation of proteins can be effected. In cases where all of the protein is to be precipitated from solutions containing other impurities, the amount of the amine salt used may be sufficient to effect substantially complete precipitation.

In the second step of the process, the insoluble amine-protein complexes precipitated as above described are further treated to separate the protein from the amine. One advantageous method of effecting such separation is by suspending the complex in water or saline solution at a slightly alkaline pH, e. g. around pH 7.4–7.6. The protein redissolves at slightly alkaline pH and leaves the insoluble amine as a residue. The protein fraction, which is precipitated in the form of the amine-protein complex, is thus recovered as a slightly alkaline solution, free from the amine, and this solution can then be adjusted to a proper pH for injection or for conversion into a lyophilized or dried product by freeze-drying.

Another advantageous method of separating the protein from the amine-protein complex is by dissolving the amine from the complex with an organic solvent in which it is soluble but in which the protein is insoluble. This gives the protein of the complex in a form free from amine and which can be dried to give a dry protein product or formed into a solution such as a saline solution for injection.

In carrying out the process, the amines, which are insoluble in water, are converted into a water-soluble salt to form an aqueous solution of the salt, at a somewhat acid pH. By adding a buffer, the amine salt solution can be brought to a point approaching neutrality, but care should be taken to prevent the precipitation of the amine and to maintain the amine in solution in the form of its salt until it is admixed with the protein solution.

When the solutions of the amine salt and of the protein are admixed, and the resulting solution is brought to a pH of about neutrality, the amine becomes insoluble and is precipitated and in the presence of protein this freshly precipitated amine will adsorb protein and bring it down in the form of an insoluble amine-protein complex which may represent a complex of the total protein of the solution, or a fraction of the protein, where the amount of amine is limited to give a fractional precipitation of the protein.

The amines, which are used in the form of their salts for admixture with the proteins and for precipitating the proteins as amine-protein complexes, include antihistamines and their analogues and other complex amines, particularly heterocyclic amines which, in general, belong to three types of compounds; namely, (1) Amines whose structural formula can be expressed by the following formula:

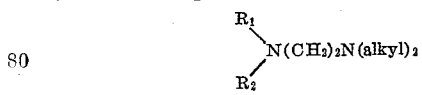

where $R_1$ stands for a member of the group containing phenyl, pyridyl, etc., and $R_2$ is a member of the group containing benzyl, thenyl, methyl, etc.;

(2) Aromatic amines having an ether linkage as indicated by the following structural formula:

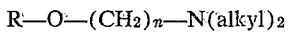

R—O—$(CH_2)_n$—N(alkyl)$_2$ (3) 9-phenyl pyridindenes having the following structural formula:

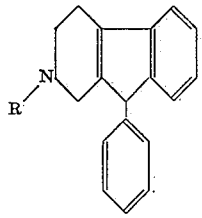

Such amines are only slightly soluble or insoluble in water. They are, in general, compounds with one ring to which is attached a long aliphatic chain containing substituted ethylene diamine; heterocyclic amines containing two rings with aliphatic chains; and polynuclear heterocyclic amines. It is possible to attach to these amines the acidic group to form salts, such as the hydrochloride, hydrobromide, sulfate, tartrate, etc.; and such compounds or salts become soluble at an acid pH, while at an alkaline pH the amines are precipitated. It is possible, by careful neutralization and the use of a buffer, to bring solutions of these salts near to a pH of 7 and still maintain them in solution at a concentration of about 1%, but care should be taken to keep the amine salts in solution and avoid precipitation until they are added to and admixed with the protein solution. If the protein solution is slightly alkaline, or by adding sufficient alkali to bring the admixed solutions to approximate neutrality or slight alkalinity, the amines become insoluble and are precipitated in the presence of the proteins and with the formation of complexes with the proteins, so that the insoluble amine carries down the protein in the formation of an amine-protein complex.

By regulating and limiting the amount of amine salt used, it is possible to accomplish fractional precipitation of one fraction of the protein while leaving the other proteins in solution; and, by adding successive amounts of amine salts to the remaining solution, to effect precipitation of one or more fractions of the protein as amine-protein complexes.

Solutions of protein are frequently admixed with non-protein impurities where it is desirable to precipitate the proteins and free them from impurities. By adding sufficient amine salt to react with all of the protein, and form insoluble amine-protein complexes, the protein can be separated from the solution, leaving the other impurities in the solution.

By treating the amine-protein complexes, the proteins or protein fractions can be recovered in a form free from the amines, either by extracting the amines with an organic solvent such as alcohol, in which they are soluble, or by dissolving the protein in a slightly alkaline solution in which the amines are insoluble.

The invention will be further illustrated by the following specific examples, but it will be understood that the invention is not limited thereto.

*Example I*

1.0 gram of thephorin tartrate is dissolved in 90 cc. of 0.02 n hydrochloric acid. 10 cc. of human serum is diluted with 10–40 cc. of normal saline solution; this solution is added to the solution of the thephorin tartrate. Sufficient alkali is added to bring the pH to about 6.8, when a heavy precipitate containing the thephorin and serum protein is formed as a complex. This precipitate is separated by centrifuging, and the supernatant liquor is discarded. The precipitate is resuspended in 100 cc. of normal saline solution at a pH of 7.4–7.6. This results in dissolving the serum protein, while leaving the amine as an insoluble residue. The serum protein solution is separated from the amine by centrifuging, thus giving a substantially quantitative recovery of the serum protein in the form of a slightly alkaline solution, while the thephorin is left as an insoluble residue.

Thephorin is 2-methyl-9-phenyl-2,3,4,9-tetra hydro-1-pyridindene tartrate.

*Example II*

1.0 gram of thephorin tartrate is dissolved in 100 cc. of 0.015 n hydrochloric acid. To this solution there is added an equal volume of elutin, a soluble insulin containing 40 units of insulin per cc.; and the pH of the admixed solutions is adjusted to 6.6–6.8. A heavy precipitate of insulin and thephorin is formed as a complex, is removed by centrifuging, and the supernatant liquor discarded. The precipitated complex is resuspended in 100 cc. of normal saline solution at pH 7.4, which dissolves the insulin protein and leaves the thephorin as an insoluble product. The solution is separated from the amine by centrifuging. The insulin is recovered quantitatively in the solution, and the thephorin is left as an insoluble precipitate. The insulin solution can then be adjusted to a desired pH and formed into a solution for marketing or injection.

*Example III*

Antitoxic horse globulin is similarly formed into a precipitate by the addition of 1% thephorin in the form of a soluble salt solution and bringing the solution to approximate neutrality. The precipitated globulin protein is separated from the complex by dissolving in a slightly alkaline solution, as described in Examples I and II.

*Example IV*

Immune rabbits' serum containing antihorse antibodies was fractionated by adding 0.5% thephorin tartrate solution and bringing the solution to approximate neutrality, and then dissolving the precipitated globulin fraction in a slightly alkaline saline solution as described in Examples I and II.

*Example V*

2 cc. of a solution containing 1% thephorin tartrate dissolved in a 3% phosphate buffer and having a slightly acid pH to maintain the salt in solution, were added to 8 cc. of soluble insulin containing 40 units per cc., and brought to a pH of around 6.8–7. The precipitate which formed immediately was centrifuged, the supernatant liquid decanted, and the precipitate resuspended to the original volume in slightly alkaline saline solution to dissolve the insulin, leaving the thephorin as an insoluble product which is separated by centrifuging.

*Example VI*

A solution of benadryl (B-dimethylaminoethyl benzhydryl ether hydrochloride) was formed into a 1% solution, and two volumes of the solution added to one volume of insulin containing 40 units of insulin per cc., the solution being sufficiently acid to maintain the benadryl in solution until the solutions were admixed, and the solution then being adjusted to a pH of around 7. The resulting amine-insulin complex precipitated was treated as described in Example I.

*Example VII*

Instead of separating the protein from the complex, as described in the above examples, by dissolving the protein in a slightly alkaline solution and leaving the amine insoluble, the complexes are extracted with methyl or ethyl alcohol to dissolve the amine and form a solution of the amine which is separated from the protein, which is insoluble in the alcohol. In treating the complexes with alcohol, low temperatures should be used, around 0° C. The amine is readily separated in this way without objectionable denaturing of the protein.

In a similar manner, other proteins can be purified or fractionated, including diphtheria and tetanus toxoids, pollen extracts, antiserums from organs and tissues, viruses for the preparation of antiviral antigens, vaccines such as H. pertussis vaccine, bacterial proteins, etc.

The present process has the advantage of enabling antigens and other proteins to be freed from foreign bodies and obtained in a purified or fractionated state.

The present process is particularly advantageous for the purification of insulin by treating soluble insulin solutions with a solution of soluble salts of the aromatic amines to form insoluble amine-insulin adsorption complexes which separate from the supernatant liquid and the impurities contained therein, followed by separation of the insulin from the amine as above described. The amount of amine required will vary somewhat with the different amines, and also depending on whether complete or fractional precipitation of the protein is desired.

The amines which can be used in the present process include the antihistamines and aromatic amines which possess very little or no effect on histamine. The following amines are suitable for use in the present process:

N,N - dimethyl-N'-(2-pyridyl)-N'(2-thienylmethyl)-ethylenediamine hydrochloride
N,N - dimethyl-N'-phenyl-N'(5-chloro-2-thienylmethyl)-ethylenediamine hydrochloride
N,N - dimethyl-N'-phenyl-N'(2-thienylmethyl)-ethylenediamine hydrochloride
N,N - dimethyl-N'-(2-pyridyl)-N'-(5-chloro - 2 - thienylmethyl)-ethylenediamine hydrochloride
a-Dimethyl - aminomethyl - a - phenyl-p-methoxy-acetophenone hydrobromide
1,5-bis (B-diethylamino-methoxy)-naphthalene dihydrochloride
1-(B-diethylamino-methoxy) - 2 - chloro-4-tert. butylbenzene sulfate
(Phenergan) 10-(dimethyl-aminopropyl) phenothiazine
(Thephorin) 2-methyl-9-phenyl-2,3,4,9 - tetrahydro-1-pyridindene tartrate
1,(3,4-dimethylphenyl)-2-amino propane sulfate
2,7-dimethyl-2,3,4,9-tetra hydro-9-(p-tolyl)-1-pyridindene hydrobromide
2,6-dimethyl-4-phenylpiperidine hydrochloride
(Benadryl) B-dimethylaminoethyl benzhydryl ether hydrochloride
(Antistine) 2 - (N-benzyl-N-phenyl-amino-methyl)-imidazoline hydrochloride
(Gonacrine) 3,6-diamino-10-methylacridinium chloride
(Proflavin) 2,8-diaminoacridine sulfate
(Pyronine) 3,6-Bis(dimethylamino)-xanthyllum chloride
(Pyribenzamine) N,N-dimethyl-N'-(a-pyridyl)-N'-benzylethylenediamine hydrochloride This application is a continuation-in-part of my prior application Serial No. 89,572, filed April 25, 1949, now abandoned.

I claim:

1. The method of separating protein from non-proteinaceous matter in solutions which comprises admixing with an aqueous solution of the protein and non-proteinaceous impurities a water-soluble salt of a high molecular weight amine, which amine in the free state is insoluble in water, to form a solution containing the protein and the amine salt at an acid pH at which the amine salt is in solution, said amine being selected from the group which consists of N,N-dimethyl-N'-(2-pyridyl)-N'-(2-thienylmethyl) - ethylenediamine; N,N - dimethyl-N'-phenyl-N'-(5-chloro-2-thienylmethyl) - ethylenediamine; N,N - dimethyl-N'-phenyl-N'-(2-thienylmethyl)-ethylenediamine; N,N - dimethyl-N'-(2-pyridyl)-N' - (5-chloro-2-thienylmethyl)-ethylenediamine; a-dimethylaminomethyl-a-phenyl - p - methoxy-acetophenone; 1,5-bis (B-diethylamino-methoxy) - naphthalene; 1-(B-diethylamino-methoxy)-2-chloro-4-tert. butylbenzene; 10-(dimethyl-aminopropyl) phenothiazine; 2-methyl-9-phenyl-2,3,4,9-tetrahydro-1-pyridindene; 1-(3,4-dimethylphenyl)-2-amino propane; 2,7-dimethyl-2,3,4,9-tetra hydro-9-(p-tolyl)-1-pyridindene; 2,6-dimethyl-4-phenylpiperidine; B-dimethylaminoethyl benzhydryl ether; 2-(N-benzyl-N-phenyl-aminomethyl) - imidazoline; 3,6-diamino-10-methylacridinium; 2,8-diaminoacridine; 3,6 - bis (dimethylamino) - xanthyllum; and N,N-dimethyl-N'-(a-pyridyl)-N'-benzylethylenediamine, adjusting the pH of the solution to approximate neutrality and thereby precipitating the insoluble amine in the form of an amine-protein complex, separating the precipitated complex from the solution, and treating the complex with a solvent selected from the class which consists of water and saline solutions at a slightly alkaline pH and lower aliphatic alcohols which dissolves one of the constituents of the amine-protein complex to separate the protein from the amine.

2. The process as set forth in claim 1, in which the amine-protein complex is treated with a slightly alkaline aqueous solvent to dissolve the protein and leave the amine in an insoluble form.

3. The process as set forth in claim 1, in which the amine-protein complex is treated with a lower aliphatic alcohol to dissolve the amine to separate it from the protein.

4. The process as set forth in claim 1, in which the protein solution is a solution of insulin and in which a purified insulin product is obtained.

5. The process as set forth in claim 1, in which a solution of insulin is treated with a salt of 2-methyl-9-phenyl-2,3,4,9-tetra hydro-1-pyridindene.

6. The process as set forth in claim 1 in which an aqueous solution containing different proteins subject to selective precipitation with the amine is treated with an amount of the amine salt sufficient to precipitate one of the proteins in the solution but insufficient to precipitate all of the proteins therein, so as to effect fractional precipitation of part of the proteinaceous matter in the solution as an amine-protein complex.

References Cited in the file of this patent

UNITED STATES PATENTS

| Number | Name | Date |
|---|---|---|
| 2,354,211 | Lang et al. | July 25, 1944 |
| 2,372,066 | Fell | Mar. 20, 1945 |

OTHER REFERENCES

Putnam: Jour. Am. Chem. Soc., vol. 66, pp. 692 to 697 (1944).

Kuhn: Ber. deu. Chem. Gesel., vol. 73B, pp. 1080 to 1100 (1940).

Jaffe: Jour. Biol. Chem., vol. 148, pp. 185 to 186 (1943).

Haley on the Antihistaminic Drugs in J. A. P. A., vol. 37, pp. 401 (1948).

Geschickter: J. A. M. A., vol. 94, No. 5, February 1, 1930, pp. 326–328.